(12) United States Patent
Wessels et al.

(10) Patent No.: US 12,110,866 B2
(45) Date of Patent: Oct. 8, 2024

(54) METHOD FOR OPERATING A WIND TURBINE AND WIND TURBINE

(71) Applicants: Nordex Energy SE & Co. KG, Hamburg (DE); Ingenieurbuero Hoffmann GmbH, Landsberg OT Peissen (DE)

(72) Inventors: Christian Wessels, Hamburg (DE); Nils Hoffmann, Halle/Saale (DE)

(73) Assignees: Nordex Energy SE & Co. KG, Hamburg (DE); Ingenieurbuero Hoffmann GmbH, Landsberg OT Peissen (DE)

( * ) Notice: Subject to any disclaimer, the term of this patent is extended or adjusted under 35 U.S.C. 154(b) by 0 days.

(21) Appl. No.: 17/521,553

(22) Filed: Nov. 8, 2021

(65) Prior Publication Data
US 2022/0154691 A1    May 19, 2022

(30) Foreign Application Priority Data

Nov. 16, 2020   (EP) .................................... 20207758

(51) Int. Cl.
*F03D 7/02*        (2006.01)
*F03D 15/00*    (2016.01)
(Continued)

(52) U.S. Cl.
CPC ........... *F03D 7/0284* (2013.01); *F03D 15/00* (2016.05); *H02J 3/001* (2020.01); *H02J 3/381* (2013.01); *H02P 9/007* (2013.01); *F05B 2220/706* (2013.01); *F05B 2270/337* (2013.01); *H02J 2300/28* (2020.01)

(58) Field of Classification Search
CPC ........ F03D 7/0284; F03D 15/00; H02J 3/001; H02J 3/381; H02J 2300/28; H02P 9/007; F05B 2220/706; F05B 2270/337; Y02E 10/72; Y02E 10/76
See application file for complete search history.

(56) References Cited

U.S. PATENT DOCUMENTS

| 2010/0052322 A1 | 3/2010 | Fortmann et al. |
| 2010/0277134 A1 | 11/2010 | Engelhardt et al. |
| (Continued) | | |

FOREIGN PATENT DOCUMENTS

| DE | 10 2008 003 299 A1 | 7/2009 |
| DE | 10 2008 034 532 A1 | 8/2009 |
| (Continued) | | |

OTHER PUBLICATIONS

Xu, L., "Coordinated Control of DFIG's Rotor and Grid Side Converters During Network Unbalance", IEEE Transactions on Power Electronics, vol. 23, No. 3, May 2008, pp. 1041 to 1049.

*Primary Examiner* — Joseph Ortega
(74) *Attorney, Agent, or Firm* — Walter Ottesen, P.A.

(57) ABSTRACT

This disclosure is directed to a method for operating a wind turbine which includes a speed-variable drive system. The system includes an electrical machine and a pulsewidth modulation-controlled converter. The speed-variable drive system is connected to an electrical grid. In the event of a transient grid fault, a frequency of the pulsewidth modulation is determined in response to a current in an electrical circuit connected to the converter.

17 Claims, 3 Drawing Sheets

(51) Int. Cl.
*H02J 3/00* (2006.01)
*H02J 3/38* (2006.01)
*H02P 9/00* (2006.01)

(56) References Cited

U.S. PATENT DOCUMENTS

| | | |
|---|---|---|
| 2010/0320762 A1 | 12/2010 | Letas et al. |
| 2010/0327584 A1 | 12/2010 | Fortmann |
| 2011/0182093 A1 | 7/2011 | Brogan et al. |
| 2015/0365031 A1* | 12/2015 | Wessels .................... H02J 3/18 |
| | | 290/44 |
| 2016/0291613 A1 | 10/2016 | Smith et al. |

FOREIGN PATENT DOCUMENTS

| | | |
|---|---|---|
| EP | 2 355 317 A1 | 8/2011 |
| EP | 2 955 808 A1 | 12/2015 |
| WO | 2008/061698 A2 | 5/2008 |

\* cited by examiner

METHOD FOR OPERATING A WIND TURBINE AND WIND TURBINE

CROSS REFERENCE TO RELATED APPLICATION

This application claims priority of European patent application no. 20 207 758.2, filed Nov. 16, 2020, the entire content of which is incorporated herein by reference.

TECHNICAL FIELD

The current disclosure relates to a method for operating a wind turbine. It also relates to a wind turbine configured to perform such a method.

BACKGROUND

For the reliable operation of a wind turbine, it is important to be able to control the wind turbine even in the event of, and to compensate for, a grid fault.

National grid codes, such as the "Technical requirements for the connection and operation of customer installations to the high voltage network" in Germany, require generation facilities connected to the grid to provide voltage support by reactive power in the event of grid faults. If a sudden deviation from the nominal grid voltage occurs, generation facilities are supposed to remain connected to the grid and to adjust the reactive current fed into the grid in proportion to the deviation from the nominal voltage. The reactive current components are to be split between the positive and negative sequence systems according to the voltage deviation in the positive and negative sequence systems.

US 2015/0365031 discloses a method for controlling a wind turbine connected to a three-phase electrical grid in the event of an asymmetric grid fault, wherein a set point value for a reactive current to be fed into the grid is split between the rotor-side converter and the grid-side converter of a converter controlling a double-fed induction generator.

US 2010/0052322 discloses a wind turbine that has a converter with a control system which comprises a negative sequence system regulation mechanism. The negative sequence system regulation mechanism comprises a phase control module embodied in such a way that an electrical variable of the negative sequence system is determined according to the phase. In this way, the available current can be provided according to the operating situation for active power or reactive power in the negative sequence system. The negative sequence system regulation mechanism is therefore phase-specific such that it can contribute directly to a stabilisation of the network in the event of asymmetrical network conditions.

US 2010/0320762 and US 2010/0327584 disclose a method for controlling a converter of a wind turbine comprising a double-fed induction generator. The converter comprises an inverter on the generator side and an inverter on the grid side. A change in the reactive current emitted by one inverter is detected and, if there is a deviation from a set value, the set value for the reactive current to be emitted by the other inverter is changed. The control of the two inverters is therefore coordinated in such a way that the total current output is optimised.

Lie, Xu: "Coordinated Control of DFIG's Rotor and Grid Side Converters During Network Unbalance", IEEE Transactions on Power Electronics, vol. 23, no. 3, May 2008, discloses a control method for an electrical generation system comprising a double-fed induction generator upon occurrence of an asymmetric grid voltage. In case of an asymmetric grid voltage, the rotor-side inverter is controlled to suppress torque oscillations. Variations of the active power fed into the grid by the stator are compensated by controlling the active power of the grid-side inverter, such that the generation system feeds a constant active power into the grid. The control method is based on an interdependent control of the currents in the positive and negative sequence systems of the rotor-side and grid-side converters.

US 2010/0277134 discloses a method for operating a wind turbine with a double-fed induction generator, in which at frequencies of the current to be impressed by the inverter on the machine side of less than 10 Hz, the switching frequency of the transistor circuits and/or of the freewheeling diodes of the inverter are altered depending on their thermal behaviour.

SUMMARY

It is an object of the present disclosure to provide a method for operating a wind turbine that allows reliable operation of the wind turbine in the event of a grid fault by the simplest possible means. It is also an object of the present disclosure to provide a wind turbine that operates reliably in the event of a grid fault.

The method of this disclosure is for operating a wind turbine that includes a speed-variable drive system. The speed-variable drive system includes an electrical machine and a converter controlled by pulsewidth modulation. The drive system is connected to an electrical grid and in normal operation it feeds electrical energy into the electrical grid. In the event of a transient grid fault, a frequency of the pulsewidth modulation is determined in response to a current in an electrical circuit connected to the converter. That is, in case of a transient grid fault the pulsewidth modulation-controlled converter is controlled with a carrier frequency of the pulsewidth modulation that is changed relative to normal operation and that is determined depending on a current present in one of the electrical circuits connected to the converter, that is, an electrical circuit connecting the electrical machine to the converter or an electrical circuit connecting the converter to the electrical grid. This is based on the understanding that the stress on semiconductor elements in the converter in case of a grid fault is significantly influenced by the currents and the switching frequency imposed by the pulsewidth modulation. By changing the frequency of the pulsewidth modulation in response to the current strength it is possible to avoid thermal overload on the semiconductor elements of the converter, preferably before exceeding any critical temperature limits.

In a preferred embodiment the speed-variable drive system includes a double-fed induction generator. The stator of the generator is directly connected to the electrical grid and the wound rotor of the generator is connected to the grid by the converter.

The converter comprises a rotor-side inverter and a grid-side inverter, both connected by a DC link. At least one of the rotor-side inverter and the grid-side inverter is controlled with a changed frequency of the pulsewidth modulation upon the transient grid fault. Based on the understanding that, in order to maintain the controllability of the double-fed induction generator, a controlled magnetisation current must be provided by the rotor-side inverter without causing any thermal overload by the amperage occurring, preferably the rotor-side inverter is controlled with a changed frequency of the pulsewidth modulation.

A preferred embodiment of the method comprises measuring the current in at least one of the circuit connecting the rotor-side inverter to the generator rotor and the circuit connecting the grid-side inverter to the grid. In a preferred embodiment the frequency of the pulsewidth modulation is decreased as the current increases. The decrease of the frequency may be monotonic or strictly monotonic with the increase of the current, at least in some ranges. There may also be an abrupt change of the frequency when the current exceeds a predefined threshold. There may also be staggered threshold values where the frequency is decreased with every threshold being exceeded.

In the method of this disclosure, preferably a voltage drop in the electrical grid is detected as a transient grid fault. The voltage drop may occur in one or more phases of the grid. The method of this disclosure is in particular suitable for voltage drops down to less than 20% of the nominal voltage or even down to zero. A transient grid fault is preferably detected if the duration of the grid fault is less than 10 seconds and in particular ranges between milliseconds and a few seconds. These transient faults are therefore faults that occur for a short period of time and can cause severe stress to the power semiconductors used.

The object of this disclosure is also achieved by a wind turbine that includes a speed-variable drive system, which in turn includes an electrical machine and a converter that is controlled by pulsewidth modulation. The speed-variable drive system is connected to an electrical grid. The converter comprises a controller that is configured to detect a transient grid fault, to measure a current in a circuit connected to the converter, that is, a circuit connecting the electrical machine to the converter or a circuit connecting the converter to the grid, and to control the converter by pulsewidth modulation. The frequency of the pulsewidth modulation is determined in response to the current measured. By controlling the converter by pulsewidth modulation with a frequency that depends on the measured current the converter is exposed to less stress in case of a transient grid fault and in particular a thermal overload is avoided.

In a preferred embodiment the electrical machine of the speed-variable drive system is a double-fed induction generator that has a stator connected to the electrical grid and a wound rotor connected to the converter. The converter comprises a rotor-side inverter connected to the wound rotor, a grid-side inverter connected to the grid, and a DC link connecting the rotor-side inverter and the grid-side inverter. The converter controller is configured to determine the frequency of the pulsewidth modulation controlling at least one of the rotor-side inverter and the grid-side converter depending on the measured current in the event of a transient grid fault. In particular, the controller changes the frequency of the pulsewidth modulation of the grid-side inverter in response to the measured current in case of a transient grid fault.

In a preferred embodiment the controller is configured to measure the current in one or more phases in at least one of the rotor-side circuit or the grid-side circuit.

In order to avoid an overload of the converter in case of a grid fault the frequency is decreased as the current increases. This may be monotonic or strictly monotonic, at least in some ranges. There may also be one or more thresholds for the measured current where the frequency is decreased abruptly when the current exceeds the threshold. This may preferably be the case for the rotor-side inverter, but may also be applied to the grid-side inverter, with the respective characteristic curves or the thresholds being the same or different.

BRIEF DESCRIPTION OF THE DRAWINGS

The invention will now be described with reference to the drawings wherein.

DESCRIPTION OF THE PREFERRED EMBODIMENTS

Figure 1:
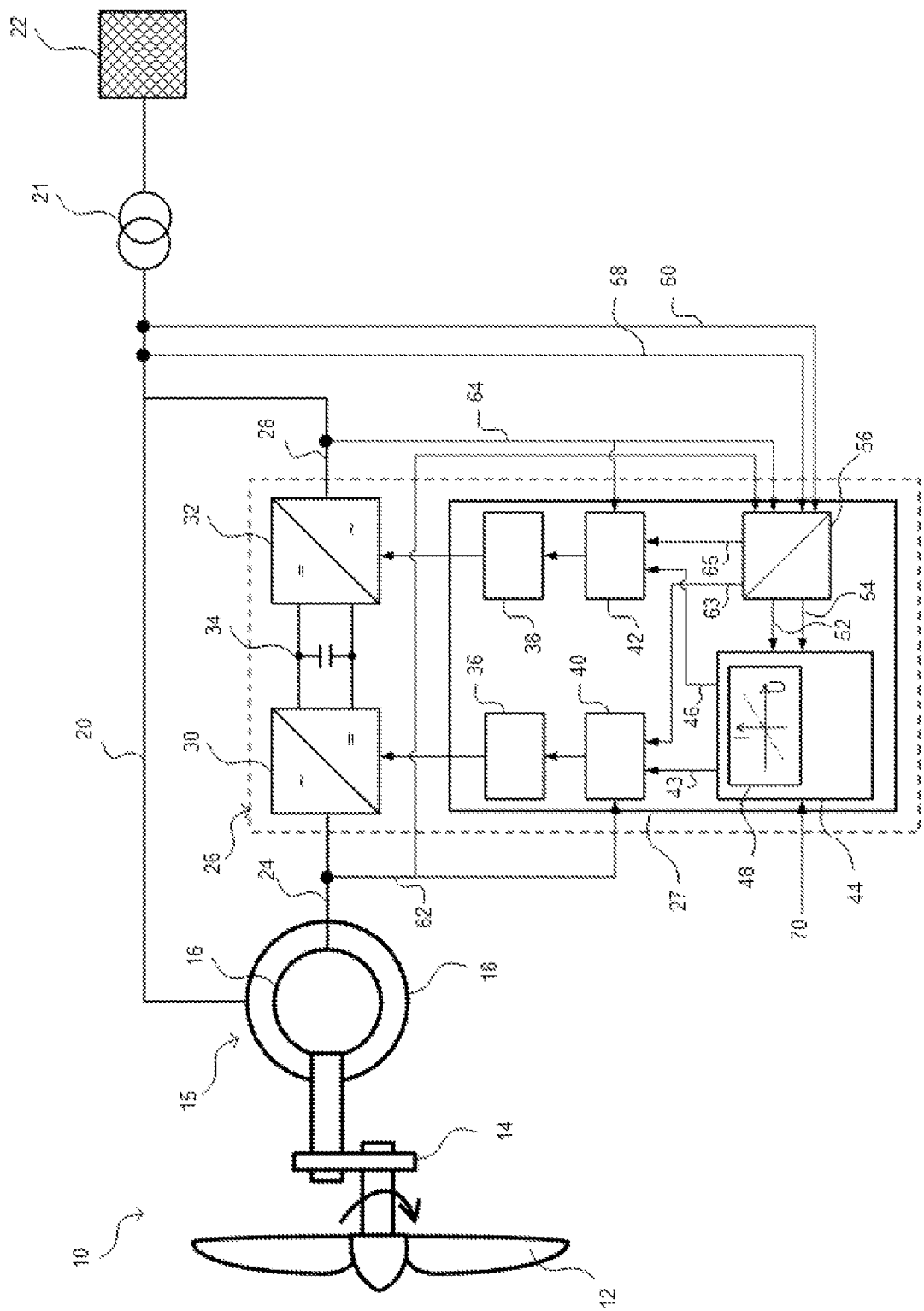
FIG. 1 is a schematic of a wind turbine.

FIG. 1 shows a schematic view of a wind turbine 10. The rotor 12 of the wind turbine 10 takes up a torque from the wind and transfers this torque via the drive train 14, which may comprise a gearbox, to the rotor 16 of the generator 15. The generator 15 of FIG. 1 is configured to convert the kinetic energy taken up by the rotor 12 into electrical energy and to feed this into a three-phase electrical grid 22. The stator 18 of the generator 15 is connected to the three-phase electrical grid 22 via a three-phase connection 20 and a transformer 21. The rotor 16 of the generator 15 is connected to the converter 26 via a three-phase connection 24. The grid side of the converter 26 is connected to the three-phase connection 20 and to the electrical grid 22 via a three-phase connection 28. For a better overview, only one line is shown for each three-phase electrical connection.

The converter 26 comprises a rotor-side inverter 30 and a grid-side inverter 32. Both are connected by a DC link 34. The converter 26 has a controller 27 configured to control the operation of the inverters 30, 32 depending on various input variables 58, 60, 62, 64, 70 present at the controller 27 and parameters and/or characteristic curves stored in the controller 27. The controller 27 is configured to control the converter 26 in accordance with the method of the present disclosure. For illustration, FIG. 1 shows a number of elements needed to implement the method of this disclosure. These elements may be implemented as software modules of a control software or as separate devices, which are configured to follow the steps of the method.

For better overview, a controller that controls the operation of the wind turbine is not shown. However, it is conceivable that parts of the method of this disclosure are implemented in such a controller and that, by way of example, a set point value for an electrical variable in dependence on the grid voltage is determined by such a controller. It is also conceivable to implement the method of this disclosure in whole or in part by analogue means.

The inverters 30, 32 are controlled by current controllers 40, 42 and pulsewidth modulators 36, 38. More specifically, the current controller 40 controls the pulsewidth modulator 36, which provides the pulsewidth modulation for the rotor-side inverter 30, and the current controller 42 controls the pulsewidth modulator 38, which provides the pulsewidth modulation for the grid-side inverter 32. Set point values 43, 46 and actual values 63, 65 for controlling the rotor-side inverter 30 and the grid-side inverter 32 are present at the current controllers 40, 42. The set point values 43, 46 are determined by a set point module 44. Measured values 62, 64 for the currents on the rotor side and on the grid side may also be present at the current controllers 40, 42, as shown in FIG. 1.

Measured voltages 58 and measured currents 60 from the three-phase connection 20 to the grid 22 are present at the controller 27. Furthermore, the measured currents 62 measured in the three-phase connection circuit (first electrical circuit) 24 between the rotor 16 of the generator 15 and the rotor-side inverter 30 and the measured currents 64 measured in the three-phase connection circuit (second electrical circuit) 28 of the grid-side inverter 32 are present as input quantities at the converter controller 27. The currents 62 measured in the three-phase connection 20 of the rotor-side inverter 30 to the rotor 16 may also be present at the current controller 40 that controls the pulsewidth modulator 36 and thus the rotor-side inverter 30. Accordingly, the currents 64 measured in the three-phase connection 28 of the grid-side inverter 32 may also be present at the current controller 42 that controls the pulsewidth modulator 38 and thus the grid-side inverter 32. This way it is possible to control the frequency of the pulsewidth modulation depending on the currents as it is explained below, referring to FIGS. 2, 3A, and 3B.

The plural used for the measured quantities 58, 60, 62, 64 is due to the fact that they are measured and processed in a multi-phase system. For example, in case of the measured voltage 58 there are voltage measurements for all three phases of the three-phase connection 20 present at the controller 27. Alternatively, for a three-phase system, without a neutral conductor, there may be only two measurements from two phases and the value of the third phase may be calculated.

The input quantities 58, 60, 62, 64 present at the converter controller 27 are measured by suitable sensors that capture the relevant quantities at the three-phase connections 20, 24, 28 and forward them to the controller 27 as input values. Dots represent these sensors in FIG. 1. The sensors may preferably be contactless. Apart from the measurements shown in FIG. 1, there may be other measurements that allow conclusions to be drawn about the input quantities. It is also conceivable that input quantities are obtained by estimation or other ways of observation. Other input quantities 70 may be present at the controller 27.

Usually the controller 27 has a transformation module 56, which is configured to transform the three-phase input quantities 58, 60, 62, 64 into a positive sequence system and a negative sequence system. The transformation module 56 therefore provides actual values 52, 54, 63, 65 for the voltages and currents in the positive and negative sequence systems to the set point module 44 and to the current controllers 40, 42. The set point module 44 is configured to provide set point values 43, 46 to the current controllers 40, 42. For example, the set point module 44 may have a characteristic curve 48, which it may use to determine a set point for a reactive current to be fed into the grid based on an actual voltage in the negative sequence system. The set point module 44 and/or the current controllers 40, 42 may further be configured to detect a grid fault based on the actual values of the grid voltage. For example, an asymmetric grid fault is detected from the voltage in the negative sequence system.

Figure 2:
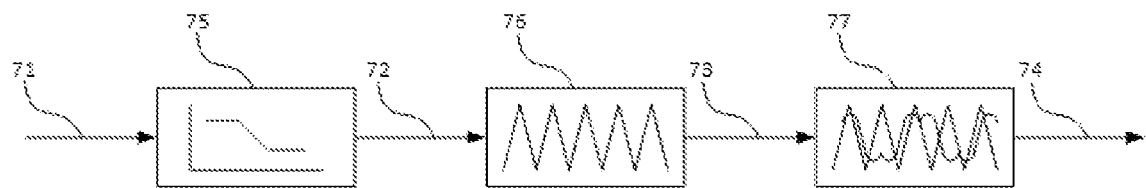
FIG. 2 is a simplified representation of a current-controlled pulsewidth modulation; and, FIGS. 3A and 3B show two characteristic curves for the frequency of the pulsewidth modulation as a function of the current.

FIG. 2 shows a simplified presentation of a current-controlled pulsewidth modulation implemented in the current controller 40, 42 and the pulsewidth modulator 36, 38. An actual current 71 is present at the adaptation function 75. Using a characteristic curve as explained below with reference to FIGS. 3A and 3B a set point value for the frequency 72 of the pulse-width modulation is determined. This is applied to the carrier generator 76, which is configured to generate a carrier with the set frequency 73. The pulsewidth modulator 77 is configured to generate a control signal 74 that is applied to the respective inverter 30, 32 in order to actuate the electronic semiconductor switches. This sequence basically applies for both the rotor-side inverter 30 and the grid-side inverter 32; however, there may be differences in the actual implementation, such as different characteristic curves for the adaptation function 75.

Figure 3A:
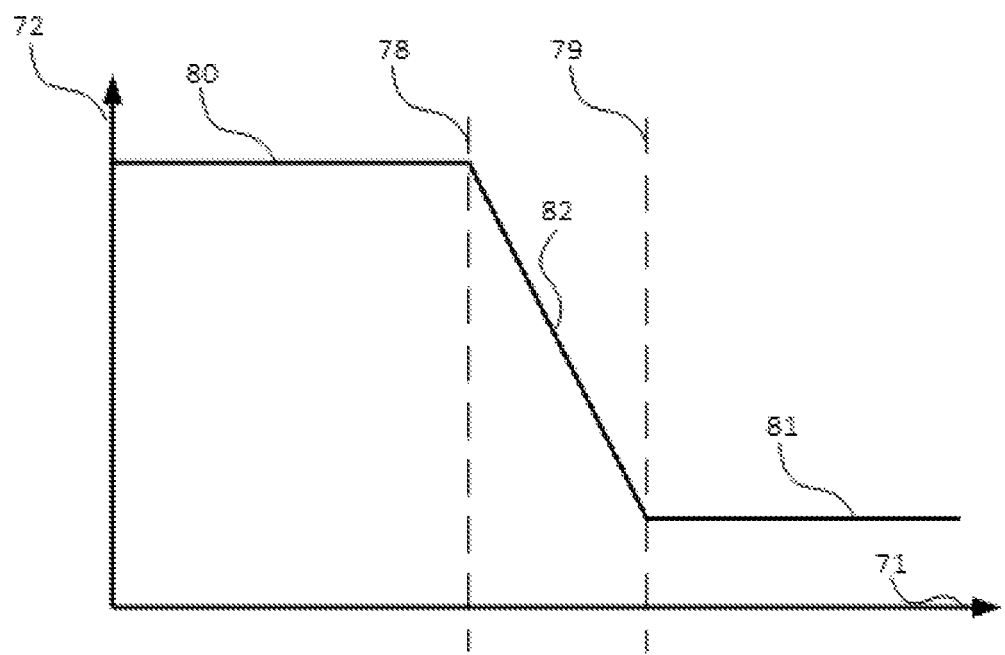
Figure 3B:
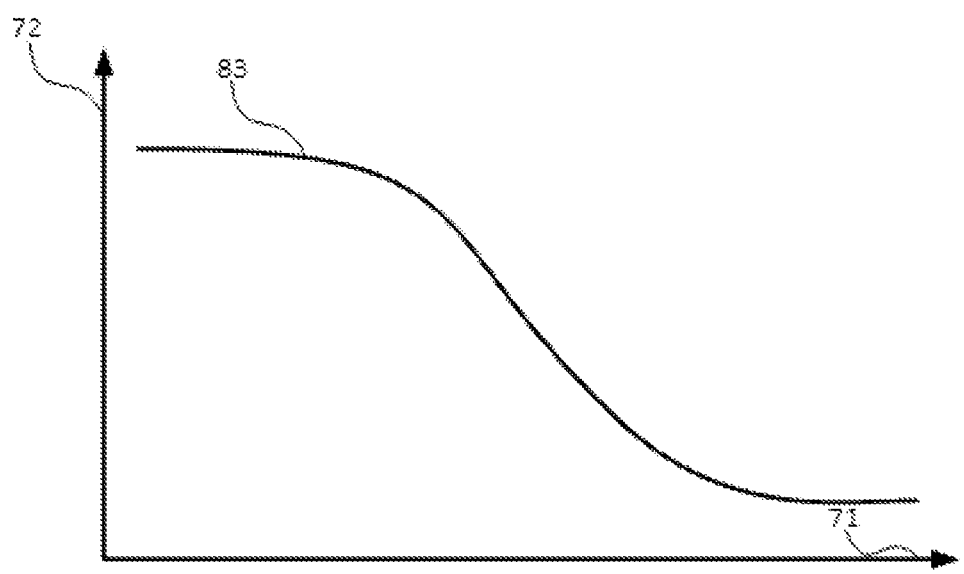

FIGS. 3A and 3B show two examples for characteristic curves of how the set point value for the frequency 72 depends on the actual current 71. The characteristic curve of FIG. 3A has a discontinuous shape, comprising a constant range 80, a linear range 82 between a first threshold 78 and a second boundary 79 and a second constant range beyond the threshold 79. As the current 71 exceeds the first threshold 78 during a grid fault, the set point value for the frequency 72 of the pulsewidth modulation is decreased in order to avoid a thermal overload on the electronic semiconductor switches of the converter 26. Beyond the second threshold 79, the semiconductor switches operate at a constant, but much lower frequency 72 than in normal operation.

The characteristic curve of FIG. 3B has a continuous shape 83, such that the frequency 72 gradually decreases with an increasing current 71. The middle section of the curve has a steeper decrease, leading to a corresponding reduction of the load on the semiconductor switches mainly in this section.

It is understood that the foregoing description is that of the preferred embodiments of the invention and that various changes and modifications may be made thereto without departing from the spirit and scope of the invention as defined in the appended claims.

LIST OF REFERENCE NUMERALS

10 Wind turbine
12 Rotor
14 Drive train
15 Generator
16 Generator rotor
18 Generator stator
20 Three-phase connection
21 Transformer
22 Electrical grid
24 Three-phase connection
26 Converter
27 Controller
28 Three-phase connection
30 Rotor-side inverter
32 Grid-side inverter
34 DC link
36 Pulsewidth modulator
38 Pulsewidth modulator
40 Current controller
42 Current controller
43 Set point value
44 Set point module
46 Set point value
48 Characteristic curve
52 Actual values (in the positive sequence system)
54 Actual values (in the negative sequence system)
56 Transformation module
58 Measured voltage
60 Measured current
62 Measured value
63 Actual values
64 Measured value
65 Actual values
70 Input quantities
71 Current
72 Set point value for frequency 73 Carrier with set frequency
74 Control signal
75 Adaptation function
76 Carrier generator
77 Pulsewidth modulator
78 Threshold
79 Threshold
80 Constant range
81 Constant range
82 Linear range
83 Continuous curve

What is claimed is:

1. A method for operating a wind turbine in association with an electrical grid, the wind turbine including: a speed-variable drive system connectable to said electrical grid; said speed-variable drive system including a generator having a rotor and a pulsewidth modulation-controlled converter including a rotor-side inverter connected to said rotor; a grid-side inverter connected to the electrical grid; and, a DC link connecting said rotor-side inverter to said grid-side inverter; a first electrical circuit, said first circuit connecting said generator to said pulsewidth modulation-controlled converter; and, a second electrical circuit, said second circuit connecting said pulsewidth modulation-controlled converter to said electrical grid; the method comprising:
in an event of a transient grid fault in the electrical grid, measuring current in at least one of said first electrical circuit and said second electrical circuit;
detecting a current increase in at least one of said first and said second electrical circuits on a basis of the current measured in at least one of said first electrical circuit and said second electrical circuit, wherein the current increase results from the transient grid fault; and,
determining a frequency of a pulsewidth modulation in response to said current increase in at least one of said first electrical circuit and said second electrical circuit.

2. The method of claim 1, wherein said generator is a double-fed induction generator; the method comprising the further step of:
in the event of the transient grid fault, determining the frequency of said pulsewidth modulation of at least one of said rotor-side inverter and said grid-side inverter in response to said current increase.

3. The method of claim 2, wherein the current increase relates to a current in at least one of a said first electrical circuit and said second electrical circuit.

4. The method of claim 1, wherein the transient grid fault is detected when a voltage drop in the electrical grid is present.

5. The method of claim 1, wherein the transient grid fault is present for a time of between milliseconds and seconds.

6. The method of claim 1, wherein the transient grid fault is present for less than 10 seconds.

7. The method of claim 1, wherein the current increase is indicative of the transient grid fault in the electrical grid.

8. A method for operating a wind turbine in association with an electrical grid, the wind turbine including: a speed-variable drive system connectable to said electrical grid; said speed-variable drive system including a generator having a rotor and a pulsewidth modulation-controlled converter including a rotor-side inverter connected to said rotor; a grid-side inverter connected to the electrical grid; and, a DC link connecting said rotor-side inverter to said grid-side inverter; a first electrical circuit, said first circuit connecting said generator to said pulsewidth modulation-controlled converter; and, a second electrical circuit, said second circuit connecting said pulsewidth modulation-controlled converter to said electrical grid; the method comprising:
in an event of a transient grid fault in the electrical grid, determining a frequency of a pulsewidth modulation in response to a current increase in at least one of said first electrical circuit and said second electrical circuit, wherein the current increase results from the transient grid fault; and,
wherein, in the event of the transient grid fault, the frequency of the pulsewidth modulation is decreased in response to the current increase.

9. The method of claim 8, wherein the frequency of the pulsewidth modulation is decreased in a monotonic or strictly monotonic manner at least in some ranges with the current increase.

10. The method of claim 8, wherein the frequency of the pulsewidth modulation decreases abruptly when the current exceeds a predetermined limit.

11. A wind turbine for operating in association with an electrical grid, the wind turbine comprising:
a speed-variable drive system connectable to said electrical grid;
said speed-variable drive system including a generator having a rotor and a pulsewidth modulation-controlled converter;
said pulsewidth modulation-controlled converter including a rotor-side inverter connected to said rotor, a grid-side inverter connected to said electrical grid, and, a DC link connecting said rotor-side inverter to said grid-side inverter;
a first electrical circuit, said first circuit connecting said generator to said pulsewidth modulation-controlled converter;
a second electrical circuit, said second circuit connecting said pulsewidth modulation-controlled converter to said electrical grid;
said pulsewidth modulation-controlled converter including a controller;
said controller being configured to detect a transient grid fault in the electrical grid and to control said pulsewidth modulation-controlled converter via a pulsewidth modulation; and,
in an event of the transient grid fault in the electrical grid, said controller being configured to detect a current increase in at least one of said first electrical circuit and said second electrical circuit, wherein the current increase results from the transient grid fault; and
said controller being further configured to determine a frequency of said pulsewidth modulation in response to said current increase in at least one of said first electrical circuit and said second electrical circuit.

12. The wind turbine of claim 11, wherein:
said generator is a double-fed induction generator; and,
said controller is further configured, in the event of the transient grid fault, to control the frequency of said pulsewidth modulation of at least one of said rotor-side inverter and said grid-side inverter in response to said current.

13. The wind turbine of claim 12, wherein said current is at least one of a current in one or more phases in said first circuit and a current in one or more phases of said second circuit.

14. The wind turbine of claim 11, wherein said controller is configured to, in the event of the transient grid fault, decrease the frequency of said pulsewidth modulation.

15. The wind turbine of claim 14, wherein said controller is configured to decrease the frequency of the pulsewidth modulation with the increase of the current in a monotonic or strictly monotonic way, at least in some ranges.

16. The wind turbine of claim 14, wherein the controller is configured to decrease the frequency of the pulsewidth modulation abruptly when the current exceeds a predetermined limit.

17. The wind turbine of claim 11, wherein said current increase is indicative of the transient grid fault in the electrical grid.

* * * * *